United States Patent
Nunn et al.

(10) Patent No.: US 6,839,867 B2
(45) Date of Patent: Jan. 4, 2005

(54) METHOD FOR LIMITING DIAGNOSTIC TESTING DURATION

(75) Inventors: Susan Adele Nunn, Austin, TX (US); MyPhuong NguyenPhu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 427 days.

(21) Appl. No.: 09/756,404

(22) Filed: Jan. 8, 2001

(65) Prior Publication Data

US 2002/0091967 A1 Jul. 11, 2002

(51) Int. Cl.[7] .............................................. G06F 11/27
(52) U.S. Cl. .......................... 714/36; 714/25; 714/42; 713/1; 713/2
(58) Field of Search ............................ 714/25, 36, 37, 714/42, 47, 55, 57; 369/19; 713/1, 2

(56) References Cited

U.S. PATENT DOCUMENTS

| | | |
|---|---|---|
| 4,393,491 A | 7/1983 | Ashlock et al. |
| 5,398,333 A | 3/1995 | Schieve et al. |
| 5,530,847 A | 6/1996 | Schieve et al. |
| 5,805,796 A | 9/1998 | Finch et al. |
| 5,978,913 A * | 11/1999 | Broyles et al. ............ 713/2 |
| 6,408,406 B1 * | 6/2002 | Parris ...................... 714/41 |

OTHER PUBLICATIONS

Nazifi, Koorosh; New Software Release Adds External Program Calls and Mixed–Signal Testing to Teradyne 1800–Series Low–Cost Board Testers; Jun. 1, 1989; Teradyne, Inc.*

Doyle, Casey D.; Computer Dictionary; 1994; Microsoft Press; Second Edition; p. 312.*

* cited by examiner

Primary Examiner—Robert Beausoliel
Assistant Examiner—Joseph D Manoskey
(74) Attorney, Agent, or Firm—Haynes and Boone, LLP

(57) ABSTRACT

A method for limiting the duration of EIDE hard drive diagnostic testing to a predetermined length of time is described. When queried by the BIOS to acquire the testing capabilities of an EIDE hard drive in a computer, the support or non-support of extended diagnostic testing and the length of time needed to complete such testing is returned to the BIOS. In a preferred embodiment, upon receipt of the aforementioned information, the BIOS examines the length of time needed to complete the testing and then allows the testing to begin only if the length of time is less than some predetermined length of time, e.g., one hour. If the length of time is greater than the predetermined length of time, the user is informed that the extended diagnostic testing would take longer than the predetermined length of time and the test is aborted.

14 Claims, 1 Drawing Sheet

METHOD FOR LIMITING DIAGNOSTIC TESTING DURATION

BACKGROUND

The disclosures herein relate generally to computer diagnostic testing and more particularly to a method for limiting the duration of such diagnostic testing.

Computers may receive warning messages that one or more Enhanced Integrated Device Electronics ("EIDE") hard drives in the computer may be running outside of normal operating range, indicating a hard drive failure may be impending. The Basic Input-Output System ("BIOS") of some computers provides a further set of diagnostic tests on the computer's attached EIDE drive(s) during the Power On Self Test ("POST") phase of the computer's power up process. The additional set of EIDE diagnostic tests could be prompted by a user request or could be initiated automatically, if necessary, by POST.

During the additional diagnostic testing, the BIOS executes tests that are integrated into the hard drive by the hard drive manufacturer. To avoid early termination of the testing, the power and reset buttons are disabled when the testing begins and re-enabled when the testing is complete. There is currently no limit on the length of time EIDE hard drive diagnostic testing may take; accordingly, the computer may remain locked for what is ultimately an unacceptable length of time while the requisite testing is conducted.

Therefore, what is needed is a method for limiting the duration of EIDE hard drive diagnostic testing.

SUMMARY

One embodiment, accordingly, is a method for limiting the duration of EIDE hard drive diagnostic testing to a predetermined length of time. When queried by the BIOS to acquire the testing capabilities of an EIDE hard drive in a computer, the support or non-support of extended diagnostic testing and the length of time needed to complete such testing is returned to the BIOS. In a preferred embodiment, upon receipt of the aforementioned information, the BIOS examines the length of time needed to complete the testing and then allows the testing to begin only if the length of time is less than some predetermined length of time, e.g., one hour. If the length of time is greater than the predetermined length of time, the user is informed that the extended diagnostic testing would take longer than the predetermined length of time and the test is aborted.

A principal advantage of the embodiment is that it places a known limit on the length of time that elapses between the time the computer is powered on and the time the operating system is loaded.

DETAILED DESCRIPTION

Figure 1:
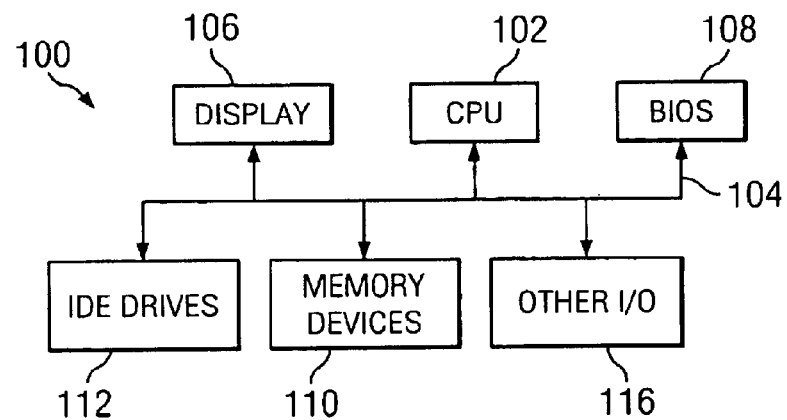
FIG. 1 is a system block diagram of a computer including features of one embodiment.

FIG. 1 is a system block diagram of a computer 100 in which the embodiment described herein may be implemented. The computer 100 includes a central processing unit 102 connected in a conventional fashion via one or more buses, represented in FIG. 1 by a bus 104, to a display device 106, system BIOS 108, a plurality of memory and storage devices, collectively designated by a reference numeral 110, one or more IDE drives 112, and other input/output devices, collectively designated by a reference numeral 116. It will be recognized by those skilled in the art that appropriate controllers, as well as other devices and/or subsystems, may be included in, or that one or more of the illustrated devices/subsystems may be excluded from, the computer 100 as necessary or desired. Moreover, as each of the aforementioned components is well known to those skilled in the art, the function and operation thereof will not be described in detail beyond that necessary to convey a complete understanding of the embodiments described herein.

Figure 2:
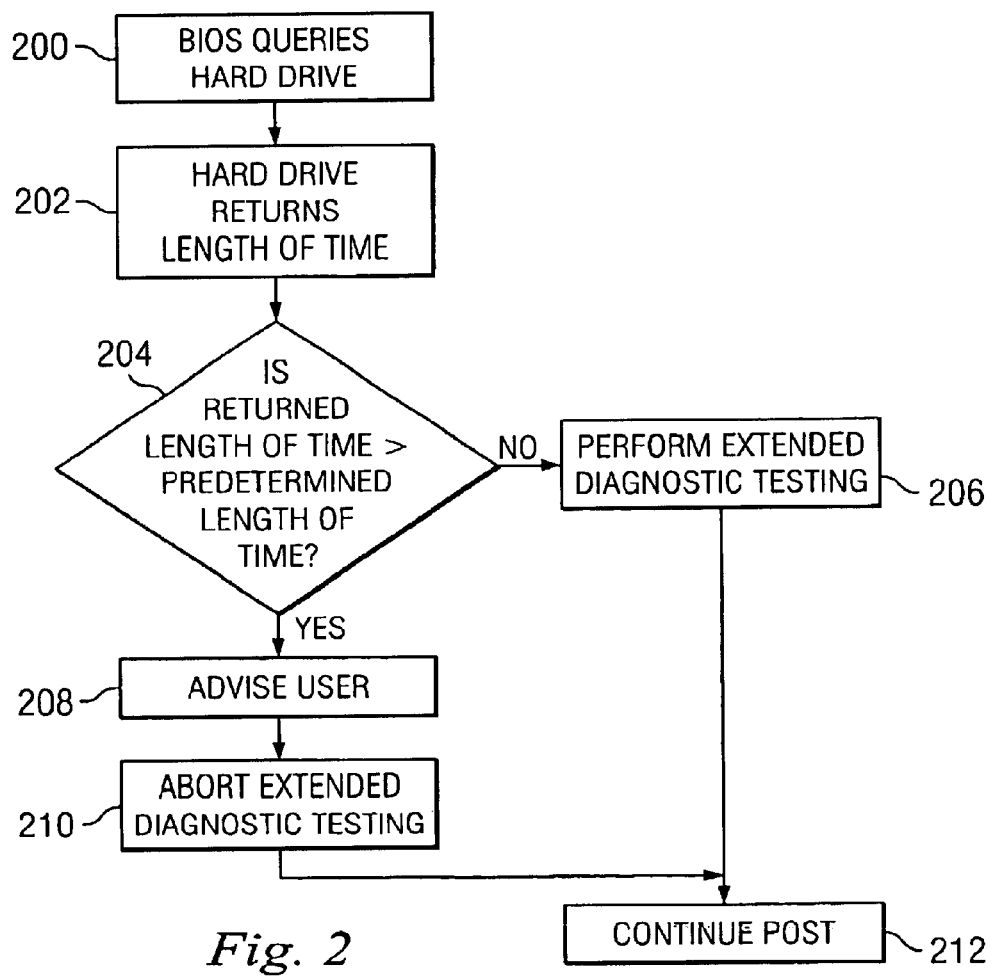
FIG. 2 is a flowchart of the operation of one embodiment for limiting the duration of extended EIDE hard drive diagnostic testing.

Referring now to FIG. 2, operation of a preferred embodiment will be described. As has been previously indicated, execution of the embodiment may be initiated either by a request from a user or by POST. It will be assumed for the sake of the example illustrated in FIG. 2 that the execution is initiated by POST. In step 200, responsive to initiation by POST, for each of the EIDE hard drives 112, the BIOS 108 queries the EIDE hard drive 112 to acquire the testing capabilities thereof, including the support or non-support of extended diagnostic testing, and the length of time needed to complete such testing, if supported. Assuming extended diagnostic testing is supported by the hard drive, in step 202, the hard drive returns to the BIOS 108 the length of time required to complete extended diagnostic testing. In step 204, the BIOS 108 compares the length of time returned in step 202 with a predetermined length of time, for example, 1 hour. If the length of time returned in step 202 is less than the predetermined length of time, execution proceeds to step 206, in which extended diagnostic testing is conducted. Otherwise, execution proceeds to step 208, in which the user is advised, e.g., with a text message displayed on the display device 106 of the computer 100, that the length of time required to perform extended diagnostic testing on the hard drive exceeds the permitted time and extended diagnostic testing will be aborted. In step 210, extended diagnostic testing is aborted.

Upon completion of either step 206 or 210, execution proceeds to step 212 in which POST continues as normal.

As a result, one embodiment provides means by which to limit the amount of time consumed in performing extended diagnostic testing in connection with an EIDE hard drive.

As can be seen, the principal advantage of the embodiment is that it places a known limit on the length of time that elapses between the time the computer is powered on and the time the operating system is loaded.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A method of limiting a duration of diagnostic testing of a hard disk drive portion of a computer system comprising:
   determining a length of time required to perform the diagnostic testing including querying the hard disk drive;
   comparing the length of time required to perform the diagnostic testing with a predetermined length of time;

if the length of time required to perform the diagnostic testing is greater than the predetermined length of time, notifying the user that the diagnostic testing will not be performed and aborting the diagnostic testing; and if the length of time required to perform the diagnostic testing is not greater than the predetermined length of time, performing the diagnostic testing.

2. The method of claim 1 wherein the querying is performed by a BIOS of the computer system.

3. The method of claim 1 wherein in response to the querying, the hard disk drive returns the length of time required to perform the diagnostic testing.

4. The method of claim 1 wherein notifying the user comprises displaying a message on a display of the computer system.

5. The method of claim 1 wherein the determining is initiated by a POST procedure.

6. The method of claim 1 wherein the determining is initiated by the user.

7. Apparatus for limiting a duration of diagnostic testing of a media drive portion of a computer system comprising:

means for determining a length of time required to perform the diagnostic testing including means for querying the media drive;

means for comparing the length of time required to perform the diagnostic testing with a predetermined length of time;

means for notifying the user that the diagnostic testing will not be performed and aborting the diagnostic testing if the length of time required to perform the diagnostic testing is greater than the predetermined length of time; and means for performing the diagnostic testing if the length of time required to perform the diagnostic testing is not greater than the predetermined length of time.

8. The apparatus of claim 7 wherein the means for querying comprises a BIOS of the computer system.

9. The apparatus of claim 7 wherein in response to the querying, the media drive returns the length of time required to perform the diagnostic testing.

10. The apparatus of claim 7 wherein the means for notifying the user comprises a message displayed on a display of the computer system.

11. A computer system comprising:

a processor;

at least one non-volatile media drive electrically connected to the processor;

means for determining a length of time required to perform diagnostic testing including means for querying the non-volatile media drive;

means for comparing the length of time required to perform the diagnostic testing with a predetermined length of time;

means for notifying the user that the diagnostic testing will not be performed and aborting the diagnostic testing if the length of time required to perform the diagnostic testing is greater than the predetermined length of time; and means for performing the diagnostic testing if the length of time required to perform the diagnostic testing is not greater than the predetermined length of time.

12. The computer system of claim 11 wherein the means for querying comprises a BIOS of the computer system.

13. The computer system of claim 12 wherein in response to the querying, non-volatile media drive returns to the BIOS the length of time required to perform the diagnostic testing.

14. The computer system of claim 11 further comprising a display, wherein the means for notifying the user comprises a message displayed on the display.

* * * * *